Sept. 4, 1945.   L. J. ST CLAIR   2,384,204
TOOL AND METHOD FOR MAKING THE SAME
Filed July 21, 1941
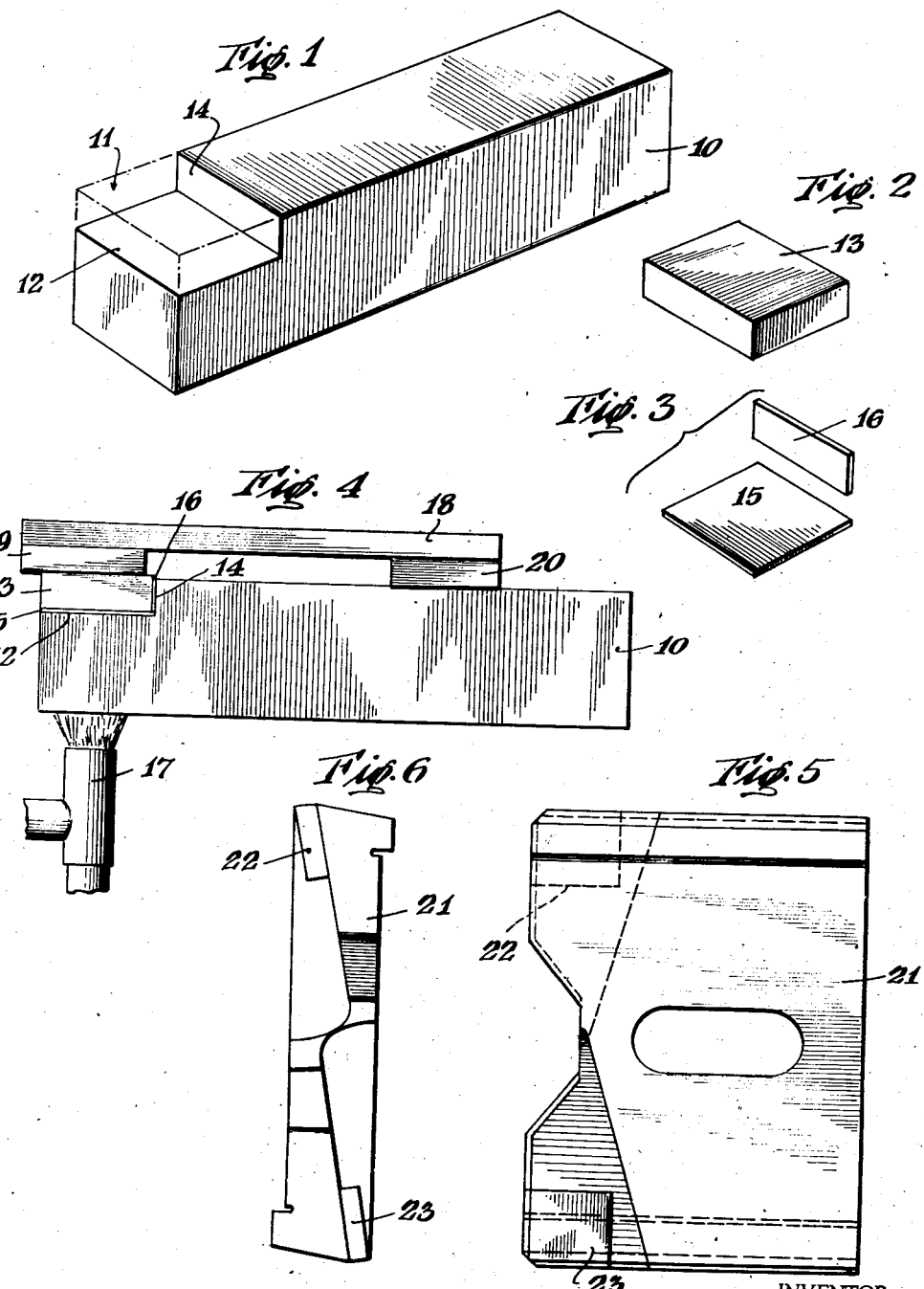
INVENTOR.

Patented Sept. 4, 1945

2,384,204

UNITED STATES PATENT OFFICE 2,384,204

TOOL AND METHOD FOR MAKING THE SAME

Leo J. St. Clair, East Orange, N. J.

Application July 21, 1941, Serial No. 403,397

4 Claims. (Cl. 76—101)

This invention relates to brazing and has reference more particularly to securing a hardened high speed steel tip to a support of ordinary carbon or alloy steel, such as a tool shank, without causing loss of hardness of the tip.

It is among the objects of the invention to provide a novel method by which a hardened high speed steel tip may be secured to a support without softening or changing the hardness characteristics of the high speed steel tip in its cutting or working area. In its general aspects the method of this invention is a brazing method which employs a low melting temperature brazing medium between the adjacent surfaces of the tip and tip support which are to be secured together, and the control of heat in such a manner as to melt the brazing medium and cause it to wet the adjacent surfaces of the tip and tip support without, however, permitting the usable section of the tip to become heated sufficiently to affect its hardness. In brazing methods previously attempted, the hardened steel tip was usually softened somewhat because of the high temperatures involved, with the result that the tool was too soft to be of value.

A further object of the invention is to obviate the shortcomings and defects of prior processes. It is a consequence and also a further object of the invention to provide a method for the economical manufacturing of high speed cutting tools by using small pieces of high speed steel for making large cutting tools.

Further objects and advantages of the present invention and the principle thereof and what I now consider the best mode in which I have contemplated applying that principle are set forth in the description and claims which follow.

In the drawing I have shown a number of detached parts which enter into the construction of a conventional form of cutting tool.

Figure 1 is a perspective view of a shank or tool support;

Fig. 2 is a view of a piece of hardened high speed cutting steel;

Fig. 3 illustrates two pieces of brazing medium;

Fig. 4 illustrates one manner by which heat may be applied to the assembly and controlled;

Fig. 5 is a side view of a large cutting tool having two small cutting tips of hardened high speed steel secured thereto; and Fig. 6 is an end view of the cutting tool shown in Fig. 5.

The tool shank is of a usual type and made of relatively inexpensive metal such as carbon or alloy steel. The shank may have any one of the many varieties of shapes commonly used for cutting and forming tools designed for different uses, and I wish to be understood that the drawing is for the purpose of illustrating an application of the process and not by way of limitation to any particular form of support or purpose of tool. While I have developed my invention in connection with the production of high speed steel cutting tools and with the view of making economical use of small pieces of hardened high speed steel, it is to be understood that the method has application to the fabrication of other devices, and I therefore do not wish to be limited in the application of the method to any particular field.

In the practice of my invention I employ a brazing medium preferably in sheet form which is sufficiently extensive in area to cover or extend over the entire adjacent surfaces of the two pieces of metal which are to be secured together. In the drawing I have shown a form of tool shank 10 which is provided with a recess 11 at one end. This is a common form of shank. The surface 12 of the recess supports the cutting tip 13 from below and the surface 14 backs up the rear edge of the cutting tip. In many tools the tip is placed flat upon the top of the shank and the need for milling the shank to form a recess is obviated.

For a brazing medium I preferably employ low melting alloy solder, such, for example, as so-called silver solder containing silver, copper, zinc and cadmium. A type of this solder which I have found satisfactory is commercially known as "Easy-Flo Brazing Alloy." I am informed that this solder contains approximately 50% silver, 15½% copper, 16½% zinc and 18% cadmium. This solder may be obtained in sheets from which pieces of appropriate form and size may be cut for covering the surfaces 12 and 14 of the tool shank. It is convenient to cut a piece of solder into two pieces 15, 16, as illustrated in Fig. 3. The solder is placed between the tip 13 and the surfaces 12 and 14 of the shank, as illustrated in Fig. 4, after these surfaces have been cleaned and a flux applied in the manner customarily done for soldering operations. The flux used must be fluid below the wetting temperature of the soldering medium. A type of flux with which I have produced satisfactory results is known as one constituting boric acid mixed with some of the alkali metal fluorides and alkali metal borates. A flux with which I have successfully practiced the present invention is obtainable on the market as "Handy Flux." This flux is distributed by the distributors from whom the above described "Easy-Flo Brazing Alloy" is obtainable.

In accordance with this invention heat is applied in such manner as to melt the solder and wet the adjacent surfaces of the tip and shank without raising the temperature of the useful portion of the hardened high speed steel tip sufficiently to soften it. Heat is applied to the shank by conduction from a source remote from the tip. A convenient way for accomplishing this is to utilize a gas or acetylene torch 17 and direct the flame to the underside of the shank as illustrated in Fig. 4.

For ordinary shop usage, before the heat is applied pieces of metal are mounted above the tip and shank in such a manner as to apply pressure to the tip and provide a path for the conduction of heat away from the top or useful portion of the tip. Direct contact with the tip by the relatively cooler added pieces of metal of large heat conducting capacity causes continuous absorption of heat from the tip and thereby keeps the temperature of the useful portion of the tip below its annealing or draw point. The pressure need be sufficient only to hold the tip in place as the solder melts and to provide good contact between the tip and the added pieces of metal.

No particular design or form of these additional pieces of metal is required so long as they have the physical characteristics of weight and conductivity to fulfill their purpose. In the drawing, there is illustrated a bar of steel 18 and two smaller blocks of steel 19 and 20. These constitute a heat conducting medium for conducting heat to the cooler end of the shank. They also provide a large radiating surface. The weight of the added pieces of metal bearing down from the tip will cause the excess of brazing medium to be squeezed out from between the adjacent surfaces and leave sufficient brazing medium to form a secure braze.

The use of an air jet or a vapor jet applied to the top or useful portion of the tip may be resorted to to keep this section below the annealing or draw point. In this case a hand-held rod is used to provide a gentle pressure on the tip to get a good braze.

Heat is supplied to the bottom of the shank in such quantity as to cause the solder to melt, but the application of the heat should not be at such a rate as to cause the useful section of the hardened high speed steel tip to be heated sufficiently to soften it. The tip may become dull red in color but must not be permitted to stay this hot for long. A reasonably skilled mechanic can easily be taught the technic involved in the practice of the invention and properly control the heat that is required so as not to soften the useful section of the hardened tip.

After the solder is melted, water, or other cooling medium such as an air jet, is quickly applied to the underside of the steel shank so as to draw the heat down and away from the high speed steel tip as soon as possible.

When the tool is cooled it is ready for use except for grinding the surfaces to the angles required for the particular use to which the tool is to be put. The process described produces a high speed steel tool devoid of the common fault of failure from cracking or checking caused by rapid changes in temperature of the hardened tip.

Due to the resilient nature of the resilient steel shank this tool appears to have shock absorbing properties not found in solid high speed steel tools. Therefore this construction oftentimes results in superior tool performance.

One application of the invention is illustrated in the fish-tail cutting tool illustrated in Figs. 5 and 6. This is used for finishing the bore of a cylinder and was formerly made of solid high speed steel. The holder portion 21 is now made of ordinary steel and the cutting edges are provided by tips 22 and 23 which are made of the more expensive hardened high speed steel.

The process of this invention results in an article having joined pieces of steel of different hardness characteristics and each of which has substantially the same physical properties as each possessed prior to its attachment to the other.

What is claimed is:

1. In a method for securing a pre-hardened high speed steel tip to a steel support, the steps comprising applying flux and a low temperature brazing medium between the joinder surfaces of the tip and support, applying heat to the support to melt the brazing medium and wet the joinder surfaces of the pre-hardened high speed steel tip and support with the brazing medium, controlling the quantity of heat going into the tip from the support to prevent heating the useful portion of the tip above its draw temperature and to set the brazing medium, discontinuing the application of heat to the support, and cooling the tip to avoid rise of its temperature above the draw point of the high speed steel so long as the heat transferable from the support is sufficient to accomplish such heating of the tip.

2. In a method for securing a pre-hardened high speed steel tip to a steel support, the steps comprising applying flux and a low temperature brazing medium between the joinder surfaces of the tip and support, applying sufficient heat to the support to melt the brazing medium and wet the joinder surfaces of the tip and support with the brazing medium and at the same time absorbing heat from the pre-hardened high speed tip by the application of a gaseous jet thereupon, and maintaining the temperature of the useful portion of the tip below the draw temperature of the high speed steel during the setting of the brazed joint and so long as heat is available in the support to raise the temperature of the tip above its draw point by heat transfer to the tip.

3. In a method for securing a pre-hardened high speed tip to a steel support, the steps comprising applying flux and a brazing medium containing silver, copper, zinc and cadmium between the joinder surfaces of the tip and support, directly heating the support to provide heat by conduction therethrough to melt the brazing medium and wet the joinder surfaces therewith while maintaining the temperature of the useful portion of the tip below the draw temperature of the high speed steel, discontinuing the heating of the support and continuing the cooling of the tip to set the brazed joint and prevent rise of temperature of the useful portion of the tip from heat transferable from the support.

4. The method of producing a composite cutting tool by attaching a pre-hardened high speed steel tip to a steel support, which comprises applying flux and a low temperature brazing medium between the surfaces of joinder of the tip and the steel support, conducting heat through the steel support from a point remote from the pre-hardened high speed steel tip to melt the brazing medium and wet the joinder surfaces of the tip and shank, setting the brazing medium by absorbing heat from the pre-hardened high speed steel tip, and maintaining the temperature of the useful or cutting portion of the tip below the draw temperature of the high speed steel so long as the heat contained in the support is sufficient to increase the temperature of the tip.

LEO J. ST. CLAIR.